(12) United States Patent
Iida et al.

(10) Patent No.: US 11,895,395 B2
(45) Date of Patent: Feb. 6, 2024

(54) REMOTE ASSISTANCE SYSTEM, TERMINAL DEVICE, AND REMOTE DEVICE

(71) Applicant: FUJIFILM Business Innovation Corp., Tokyo (JP)

(72) Inventors: Kiyoshi Iida, Kanagawa (JP); Hirotake Sasaki, Kanagawa (JP); Takeshi Nagamine, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 111 days.

(21) Appl. No.: 17/646,899

(22) Filed: Jan. 4, 2022

(65) Prior Publication Data
US 2023/0056882 A1 Feb. 23, 2023

(30) Foreign Application Priority Data
Aug. 17, 2021 (JP) ................. 2021-132905

(51) Int. Cl.
*H04N 23/60* (2023.01)
*H04N 7/18* (2006.01)
*H04N 23/63* (2023.01)
*H04N 1/00* (2006.01)

(52) U.S. Cl.
CPC ............. *H04N 23/64* (2023.01); *H04N 7/18* (2013.01); *H04N 23/633* (2023.01); *H04N 1/00344* (2013.01)

(58) Field of Classification Search
None
See application file for complete search history.

(56) References Cited

U.S. PATENT DOCUMENTS

| 9,716,826 | B2* | 7/2017 | Wu ..................... H04N 23/631 |
| 10,706,624 | B1* | 7/2020 | Chuah ................. H04N 13/282 |
| 10,901,571 | B2 | 1/2021 | Matsuzoe et al. |
| 2012/0327252 | A1* | 12/2012 | Nichols ............... H04N 9/8205 |
| | | | 348/207.1 |

(Continued)

FOREIGN PATENT DOCUMENTS

| JP | 2008-257385 A | 10/2008 |
| JP | 2017-068689 A | 4/2017 |
| JP | 2018-063589 A | 4/2018 |

*Primary Examiner* — Stefan Gadomski
(74) *Attorney, Agent, or Firm* — Sughrue Mion, PLLC

(57) ABSTRACT

A remote assistance system includes a terminal device and a remote device, the terminal device including a first processor configured to: transmit information of multiple images obtained by capturing a subject from respectively different directions to the remote device; receive display information for displaying a guidance image that guides a user to a requested capture position, the guidance image being derived by the remote device using the image information; and display the guidance image indicated by the received display information, the remote device including a second processor configured to: receive the information of multiple images from the terminal device; display images indicated by the received information of multiple images; receive a selection of an image captured from the requested capture position from among the displayed images; derive the display information using the selected image; and transmit the derived display information to the terminal device.

19 Claims, 12 Drawing Sheets

FIG. 11

(56) References Cited

U.S. PATENT DOCUMENTS

| | | | | |
|---|---|---|---|---|
| 2012/0327265 A1* | 12/2012 | Arujunan | ........... | H04N 1/00188 |
| | | | | 348/E5.031 |
| 2014/0079300 A1* | 3/2014 | Wolfer | ................ | G06V 40/67 |
| | | | | 382/124 |
| 2014/0198215 A1* | 7/2014 | Schumm | ................ | H04N 7/181 |
| | | | | 348/159 |
| 2014/0247325 A1* | 9/2014 | Wu | ...................... | H04N 13/296 |
| | | | | 348/39 |
| 2015/0035857 A1* | 2/2015 | Lowe | ................... | H04N 23/698 |
| | | | | 345/629 |
| 2017/0208245 A1* | 7/2017 | Castillo | ............... | H04N 1/2104 |
| 2018/0096202 A1* | 4/2018 | Stathacopoulos | ......... | G06T 7/70 |
| 2019/0028637 A1* | 1/2019 | Kolesov | ................ | H04N 23/63 |
| 2019/0370593 A1* | 12/2019 | Nakao | ................... | H04N 23/60 |
| 2020/0098171 A1* | 3/2020 | Castillo | ................... | G06T 17/00 |
| 2020/0410761 A1* | 12/2020 | Cragg | .................... | G06F 3/011 |
| 2021/0235023 A1* | 7/2021 | Imamura | ................ | G01M 3/02 |
| 2021/0243362 A1* | 8/2021 | Castillo | ................. | G06V 10/26 |
| 2021/0272265 A1* | 9/2021 | Krishnan | ................ | G06T 7/90 |
| 2021/0312702 A1* | 10/2021 | Holzer | ................... | H04N 23/64 |
| 2021/0368099 A1* | 11/2021 | Nguyen | ............. | H04N 23/698 |
| 2022/0245900 A1* | 8/2022 | Tan | ............................ | G06T 7/80 |

* cited by examiner

| CAPTURE ORDER | CAPTURED IMAGE | CAPTURE POSITION | DIRECTION |
|---|---|---|---|
| 1 | (IMAGE INFORMATION P1) | (X1,Y1,Z1) | A1 |
| 2 | (IMAGE INFORMATION P2) | (X2,Y2,Z1) | B1 |
| ⋮ | ⋮ | ⋮ | ⋮ |

RECAPTURE INSTRUCTION SCREEN

★ PLEASE RECAPTURE SEVERAL PICTURES AT A POSITION CLOSER THAN WHERE THIS IMAGE WAS CAPTURED.

FINISH

GUIDANCE IMAGE DISPLAY SCREEN

★ PLEASE SET THE POSITION AND DIRECTION OF YOUR TERMINAL SO THAT THE DASHED-LINE QUADRILATERAL IS A RECTANGLE.

FINISH

DIRECTION OF SUBJECT

REMOTE ASSISTANCE SYSTEM, TERMINAL DEVICE, AND REMOTE DEVICE

CROSS-REFERENCE TO RELATED APPLICATIONS

This application is based on and claims priority under 35 USC 119 from Japanese Patent Application No. 2021-132905 filed Aug. 17, 2021.

BACKGROUND

(i) Technical Field

The present disclosure relates to a remote assistance system, a terminal device, and a remote device.

(ii) Related Art

Japanese Unexamined Patent Application Publication No. 2008-257385 discloses a monitoring assistance system with the objective of providing a device that ensures the safety of a patroller and increases the efficiency of patrol security at a low cost by appropriately ascertaining the situation surrounding the patroller from a remote monitoring center. The monitoring assistance system includes a mobile terminal provided with a remote monitoring means including a three-dimensional spatial information database and a virtual reality display unit that displays the information, a position acquisition means, and a pointing direction acquisition means. Additionally, the monitoring assistance system transmits line-of-sight information from the mobile terminal carried by the patroller to a remote monitoring means, thereby ascertaining the spatial information in front of the patroller's eyes from the remote monitoring means appropriately and at low cost.

In addition, Japanese Unexamined Patent Application Publication No. 2018-063589 discloses an information processing device with the objective of providing a mechanism making it possible to move a user's viewpoint to an appropriate position. The information processing device receives an instruction to move a viewpoint position in a virtual space of a wearable display device to a previous position of the display device. Additionally, when the instruction to move the viewpoint position is received, the information processing device determines a position a predetermined distance away from the previous position of the display device at which the instruction was received as the destination position of the viewpoint position, and changes the viewpoint position in the virtual space of the display device to move to the determined position.

Furthermore, Japanese Unexamined Patent Application Publication No. 2017-068689 discloses a guidance assistance method with the objective of smoothly guiding a user to a target. The guidance assistance method detects target information from spatial information stored in advance, and measures the position of a display device in a space stipulated by the spatial information and the position of the target stipulated by the target information. The guidance assistance method also determines the position and motion of an icon to be displayed on the display device on the basis of the measured position of the display device and the measured position of the target, and displays the icon on the display device at the determined position and with the determined motion. Moreover, the guidance assistance method performs a process of changing the position and motion of the icon displayed on the display device according to changes in the position of the display device.

SUMMARY

Aspects of non-limiting embodiments of the present disclosure relate to providing a remote assistance system, a terminal device, and a remote device capable of guiding a user to a requested capture position more easily compared to the case of guiding the user by using only a captured image captured from a single direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a remote assistance system including a terminal device and a remote device, the terminal device including a first processor configured to: transmit information of a plurality of images obtained by capturing a subject from respectively different directions to the remote device; receive display information for displaying a guidance image that guides a user to a requested capture position, the guidance image being derived by the remote device using the image information; and display the guidance image indicated by the received display information, the remote device including a second processor configured to: receive the information of a plurality of images from the terminal device; display images indicated by the received information of a plurality of images; receive a selection of an image captured from the requested capture position from among the displayed images; derive the display information using the selected image; and transmit the derived display information to the terminal device.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments for carrying out the present disclosure will be described in detail and with reference to the drawings. Note that the exemplary embodiments describe a case of applying the present disclosure to a remote assistance system including multiple terminal devices configured as mobile terminals used by each user individually and a remote device provided in a remote location away from the terminal devices. Furthermore, the exemplary embodiments describe a case where the user is a worker who performs maintenance on an image forming device such as a digital multi-function device or a printer, and the remote assistance system provides remote assistance with the maintenance performed on the image forming device by the worker.

First Exemplary Embodiment

Figure 1:
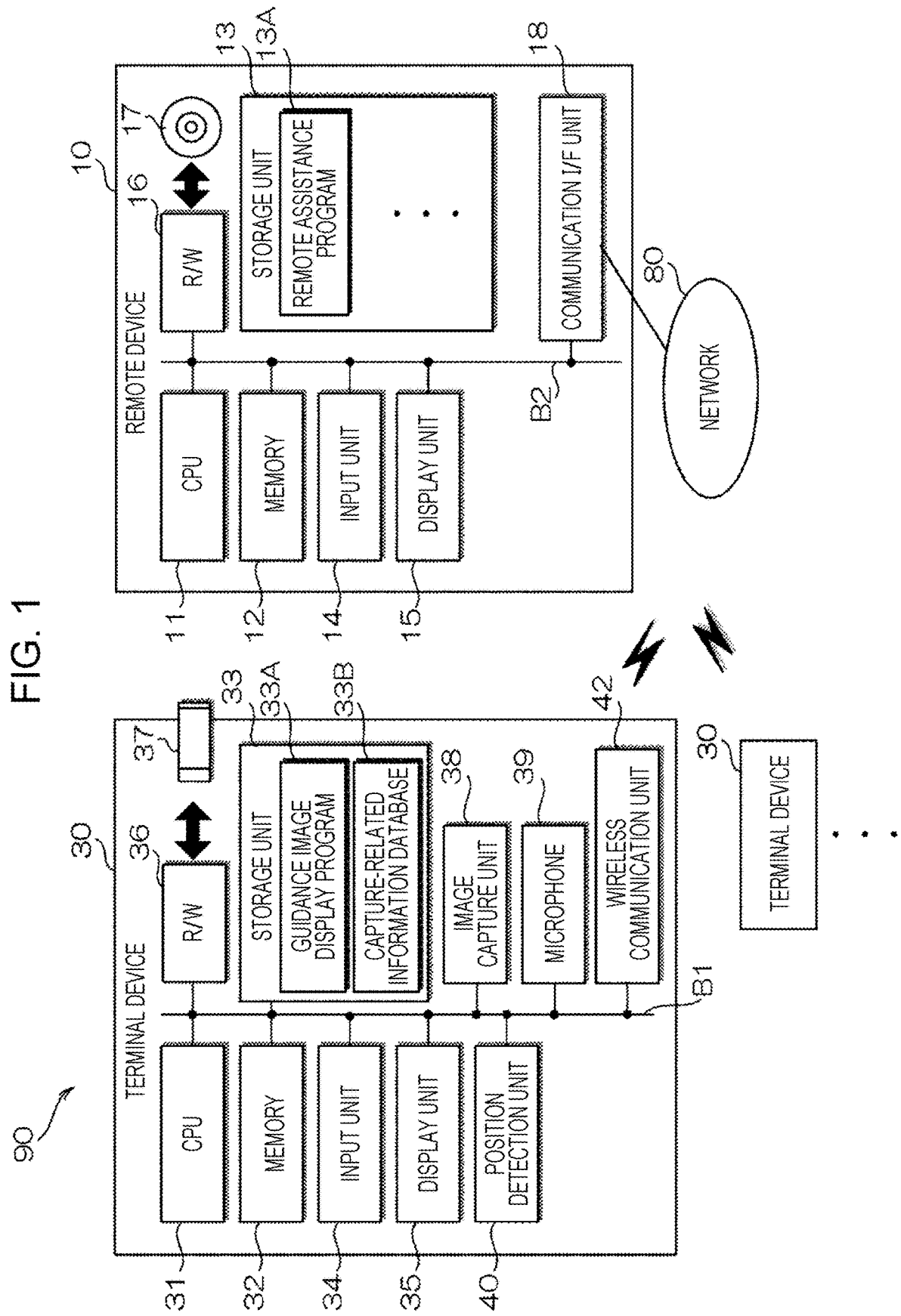
FIG. 1 is a block diagram illustrating an example of a hardware configuration of a remote assistance system according to an exemplary embodiment.
Figure 2:
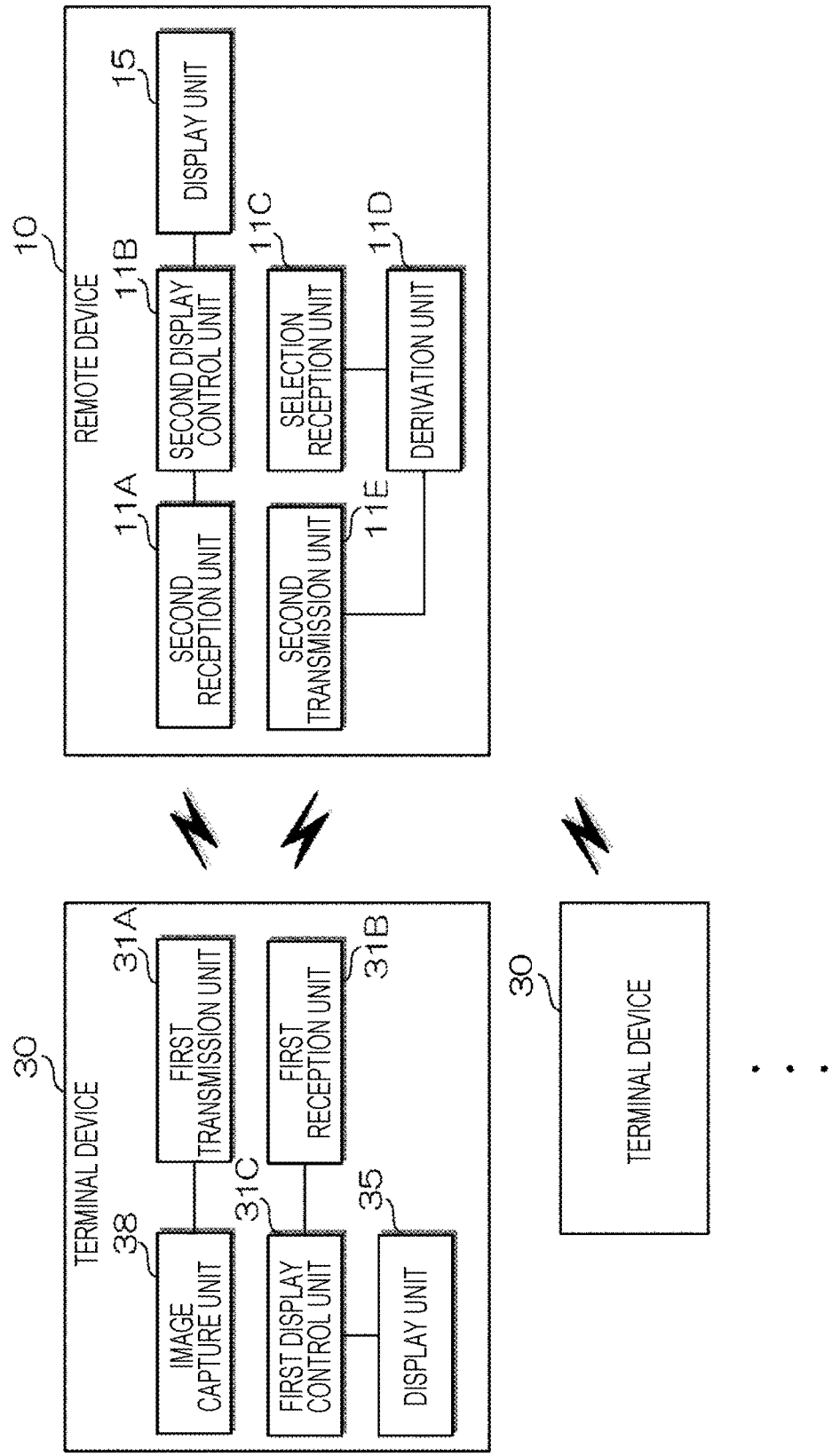
FIG. 2 is a block diagram illustrating an example of a functional configuration of the remote assistance system according to an exemplary embodiment.

First, FIGS. 1 and 2 will be referenced to describe a configuration of a remote assistance system 90 according to the present exemplary embodiment. FIG. 1 is a block diagram illustrating an example of a hardware configuration of a remote assistance system according to the present exemplary embodiment. Also, FIG. 2 is a block diagram illustrating an example of a functional configuration of the remote assistance system according to the present exemplary embodiment.

As illustrated in FIG. 1, the remote assistance system 90 according to the present exemplary embodiment includes a remote device 10 and multiple terminal devices 30, each of which is accessible over a network 80. Note that examples of the remote device 10 include an information processing device such as a personal computer or a server computer. Also, examples of the terminal device 30 include a mobile terminal such as a smartphone, a tablet, or a personal digital assistance (PDA).

The terminal devices 30 according to the present exemplary embodiment are respectively carried by multiple users who use the remote assistance system 90 (hereinafter simply referred to as "users") when each user performs maintenance on an image forming device. Each terminal device 30 is provided with a central processing unit (CPU) 31, memory 32 that acts as a temporary storage area, a non-volatile storage unit 33, an input unit 34 such as a touch panel, a display unit 35 such as a liquid crystal display, and a media reading and writing device (R/W) 36. Also, each terminal device 30 is provided with an image capture unit 38, a microphone 39, a position detection unit 40, and a wireless communication unit 42. The CPU 31, memory 32, storage unit 33, input unit 34, display unit 35, media reading and writing device 36, image capture unit 38, microphone 39, position detection unit 40, and wireless communication unit 42 are interconnected through a bus B1. The media reading and writing device 36 reads out information written to a recording medium 37 and also writes information to the recording medium 37.

The storage unit 33 is realized by a hard disk drive (HDD), a solid-state drive (SSD), flash memory, or the like. A guidance image display program 33A is stored in the storage unit 33, which acts as a storage medium. The guidance image display program 33A is stored in the storage unit 33 by loading the recording medium 37 with the guidance image display program 33A written thereto into the media reading and writing device 36 and causing the media reading and writing device 36 to read out the guidance image display program 33A from the recording medium 37. The CPU 31 reads out and loads the guidance image display program 33A from the storage unit 33 into the memory 32, and sequentially executes processes included in the guidance image display program 33A.

In addition, a capture-related information database 33B is stored in the storage unit 33. The capture-related information database 33B will be described in detail later.

Also, the image capture unit 38 according to the present exemplary embodiment captures images of an image forming device on which maintenance is to be performed, and outputs image information obtained by the capturing. Also, the microphone 39 according to the present exemplary embodiment picks up speech uttered by the user and outputs speech information.

Furthermore, the position detection unit 40 according to the present exemplary embodiment detects the position of the terminal device 30 itself and outputs position information. In the present exemplary embodiment, a position detection unit utilizing the Global Positioning System (GPS) is applied, but the position detection unit 40 is not limited to such a configuration. For example, a position detection unit that uses position information acquired from a Wi-Fi (registered trademark) router, a position detection unit that detects position using a beacon, or a position detection unit that detects position through image analysis using a captured image may also be applied as the position detection unit 40.

On the other hand, the remote device 10 is a device that plays a central role in the remote assistance system 90, and derives a guidance image described in detail later to be presented to the user. The remote device 10 according to the exemplary embodiment is provided with a CPU 11, a memory 12 that acts as a temporary storage area, a non-volatile storage unit 13, an input unit 14 such as a keyboard and a mouse, a display unit 15 such as a liquid crystal display, a media reading and writing device 16, and a communication interface (I/F) unit 18. The CPU 11, memory 12, storage unit 13, input unit 14, display unit 15, media reading and writing device 16, and communication I/F unit 18 are interconnected through a bus B2. The media reading and writing device 16 reads out information written to a recording medium 17 and also writes information to the recording medium 17.

The storage unit 13 is realized by an HDD, an SSD, flash memory, or the like. A remote assistance program 13A is stored in the storage unit 13, which acts as a storage medium. The remote assistance program 13A is stored in the storage unit 13 by loading the recording medium 17 with the remote assistance program 13A written thereto into the media reading and writing device 16 and causing the media reading and writing device 16 to read out the remote assistance program 13A from the recording medium 17. The CPU 11 reads out and loads the remote assistance program 13A from the storage unit 13 into the memory 12, and sequentially executes processes included in the remote assistance program 13A.

Note that in the present exemplary embodiment, a public communication channel such as the Internet or the telephone network is applied as the network 80, but the network 80 is not limited thereto. For example, an internal corporate communication channel such as a local area network (LAN) or a wide area network (WAN), or a combination of an internal corporate communication channel and a public communication channel may also be applied as the network 80.

Next, FIG. 2 will be referenced to describe a functional configuration of the remote device 10 and the terminal device 30 according to the present exemplary embodiment.

As illustrated in FIG. 2, the terminal device 30 according to the present exemplary embodiment includes a first transmission unit 31A, a first reception unit 31B, and a first display control unit 31C. The CPU 31 of the terminal device 30 functions as the first transmission unit 31A, the first reception unit 31B, and the first display control unit 31C by executing the guidance image display program 33A.

The first transmission unit 31A according to the present exemplary embodiment transmits the information of multiple images (hereinafter simply referred to as the "image information") obtained by capturing a subject from respectively different directions to the remote device 10. Note that as described above, in the present exemplary embodiment, an image forming device on which maintenance is to be performed is applied as the subject.

Also, the first reception unit 31B according to the present exemplary embodiment receives display information for displaying a guidance image that guides the user to a requested capture position (hereinafter simply referred to as the "display information"), the guidance image being derived by the remote device 10 using the image information. Note that in the present exemplary embodiment the transmission of the image information by the first transmission unit 31A and the reception of the display information by the first reception unit 31B are performed via the wireless communication unit 42, but the configuration is not limited thereto.

Additionally, the first display control unit 31C according to the present exemplary embodiment uses the display unit 35 to display a guidance image indicated by the received display information (hereinafter simply referred to as the "guidance image").

On the other hand, as illustrated in FIG. 2, the remote device 10 according to the present exemplary embodiment includes a second reception unit 11A, a second display control unit 11B, a selection reception unit 11C, a derivation unit 11D, and a second transmission unit 11E. The CPU 11 of the remote device 10 functions as the second reception unit 11A, the second display control unit 11B, the selection reception unit 11C, the derivation unit 11D, and the second transmission unit 11E generally by executing the remote assistance program 13A.

The second reception unit 11A according to the present exemplary embodiment receives the information of multiple images from the terminal device 30. Also, the second display control unit 11B according to the present exemplary embodiment uses the display unit 15 to display images indicated by the received information of multiple images.

In addition, the selection reception unit 11C according to the present exemplary embodiment receives a selection of an image captured from a requested capture position from among the displayed images. Note that in the present exemplary embodiment, the reception of the selection of an image by the selection reception unit 11C is performed according to a user operation on the remote device 10 via the input unit 14, but the configuration is not limited thereto. For example, the remote device 10 may be provided with a speech input unit such as a microphone, and the selection of an image may be received by speech inputted into the speech input unit.

Here, the derivation unit 11D according to the present exemplary embodiment derives the display information described above using the selected image. Thereafter, the second transmission unit 11E according to the present exemplary embodiment transmits the derived display information to the terminal device 30.

Note that in the present exemplary embodiment, image information expressing a still image is applied as the image information. Consequently, the image capture unit 38 provided in the terminal device 30 is assumed to be capable of capturing still images, but the image capture unit 38 is not limited thereto. For example, an image capture unit capable of capturing both still images and video images obviously may also be applied as the image capture unit 38. Also, in the present exemplary embodiment, image information expressing a color image is applied as the image information, and consequently the image capture unit 38 according to the present exemplary embodiment is assumed to be capable of capturing color images, but the configuration is not limited thereto. For example, image information expressing a monochrome image may be applied as the image information, and an image capture unit capable of capturing monochrome images may be applied as the image capture unit 38.

Also, in the present exemplary embodiment, an image that is in a predetermined state when the terminal device 30 is moved to a requested capture position and direction is applied as the guidance image, and more particularly, an undistorted state is applied as the predetermined state in the present exemplary embodiment. Furthermore, a rectangular state is applied as the undistorted state in the present exemplary embodiment.

Also, in the present exemplary embodiment, the different directions described above are assumed to include a direction that directly faces the front of the subject.

Also, in the present exemplary embodiment, the first display control unit 31C changes the display state of the guidance image according to the degree of misalignment between the user and the requested capture position. Here, in the present exemplary embodiment, the degree of transparency is applied as the display state, and the degree of transparency is increased as the degree of misalignment is reduced. However, the configuration is not limited to the above, and any of a blink interval or a display color may also be applied as the display state instead of the degree of transparency, or a combination of two or three of the blink interval, the display color, or the degree of transparency may also be applied as the display state.

Also, in the present exemplary embodiment, if a designated position on the subject is captured, the first display control unit 31C virtually displays a marker at the position.

Furthermore, in the present exemplary embodiment, in the case where an image captured from the requested capture position is not included among the images expressed by the received information of multiple images, the second transmission unit 11E transmits instruction information instructing the user to recapture an image (hereinafter simply referred to as "instruction information") to the terminal device 30. Here, in the present exemplary embodiment, the instruction information includes specification information that specifies the image information captured at the capture position closest to the requested capture position.

Figures 3, 4:
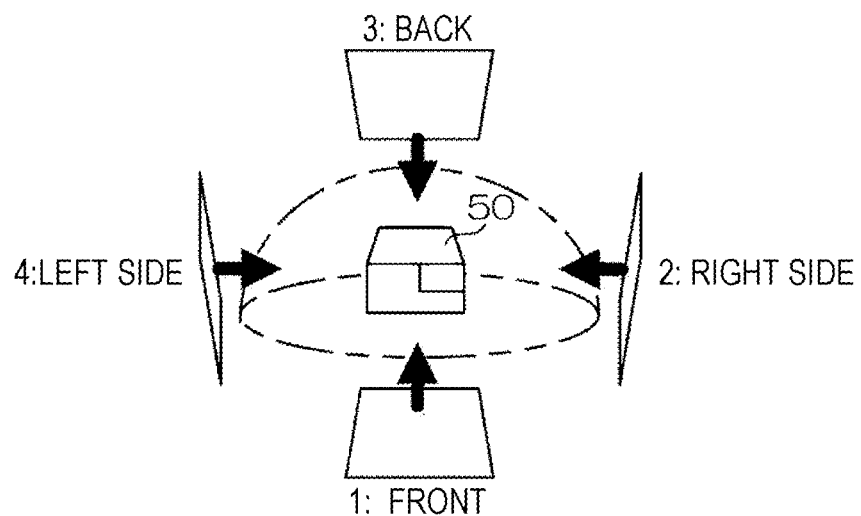
FIG. 3 is a schematic diagram illustrating an example of the structure of a capture-related information database according to an exemplary embodiment.
FIG. 4 is a diagram accompanying an explanation of a remote assistance process according to an exemplary embodiment, and is a perspective view illustrating an example of a situation of capturing images with a terminal device.

Next, FIG. 3 will be referenced to describe the capture-related information database 33B according to the present exemplary embodiment. FIG. 3 is a schematic diagram illustrating an example of the structure of the capture-related information database 33B according to the present exemplary embodiment.

The capture-related information database 33B according to the present exemplary embodiment is a database in which information related to the information of multiple images described above is registered. As illustrated in FIG. 3, information indicating a capture order, a captured image, a capture position, and a direction is stored in association with each other in the capture-related information database 33B according to the present exemplary embodiment.

The capture order is information indicating the order in which images of the subject have been captured by the user, and the captured image is the image information itself obtained by the corresponding image capture. Furthermore, the capture position is information indicating the position of the terminal device 30 when the corresponding image capture was performed, and the direction is information indicating the direction in which the terminal device 30 faced when the corresponding image capture was performed.

In the present exemplary embodiment, the position detection unit 40 uses GPS to obtain information indicating a position of the terminal device 30 in the three dimensions of the horizontal planar directions and the height direction as the information indicating the capture position, but the capture position is not limited thereto. For example, a configuration that uses a beacon or the like to detect position is also possible, as described above.

Also, in the present exemplary embodiment, a gyro sensor (not illustrated) built into the terminal device 30 is used to obtain information indicating the direction of image capture by the image capture unit 38 in the state where the subject is positioned approximately centrally from left to right within the angle of view of the image capture by the image capture unit 38 at the corresponding capture position as the information indicating the direction. However, the direction is not limited to the above, and information indicating the direction may also be obtained by an acceleration sensor or the like, for example.

In other words, in the remote assistance system 90 according to the present exemplary embodiment, before performing maintenance, the user uses the terminal device 30 he or she carries to capture a subject 50 on which maintenance is to be performed from multiple predetermined directions (in the present exemplary embodiment, the four directions of the front, the right side, the back, and the left side of the subject 50). Additionally, the terminal device 30 according to the present exemplary embodiment transmits the image information obtained by the image capture from multiple directions, together with the information indicating the capture order and the capture position and direction of the terminal device 30 when the image capture was performed, to the remote device 10.

The capture-related information database 33B according to the present exemplary embodiment is a component that temporarily stores the above information in the terminal device 30 itself before transmitting the information to the remote device 10.

Figure 5:
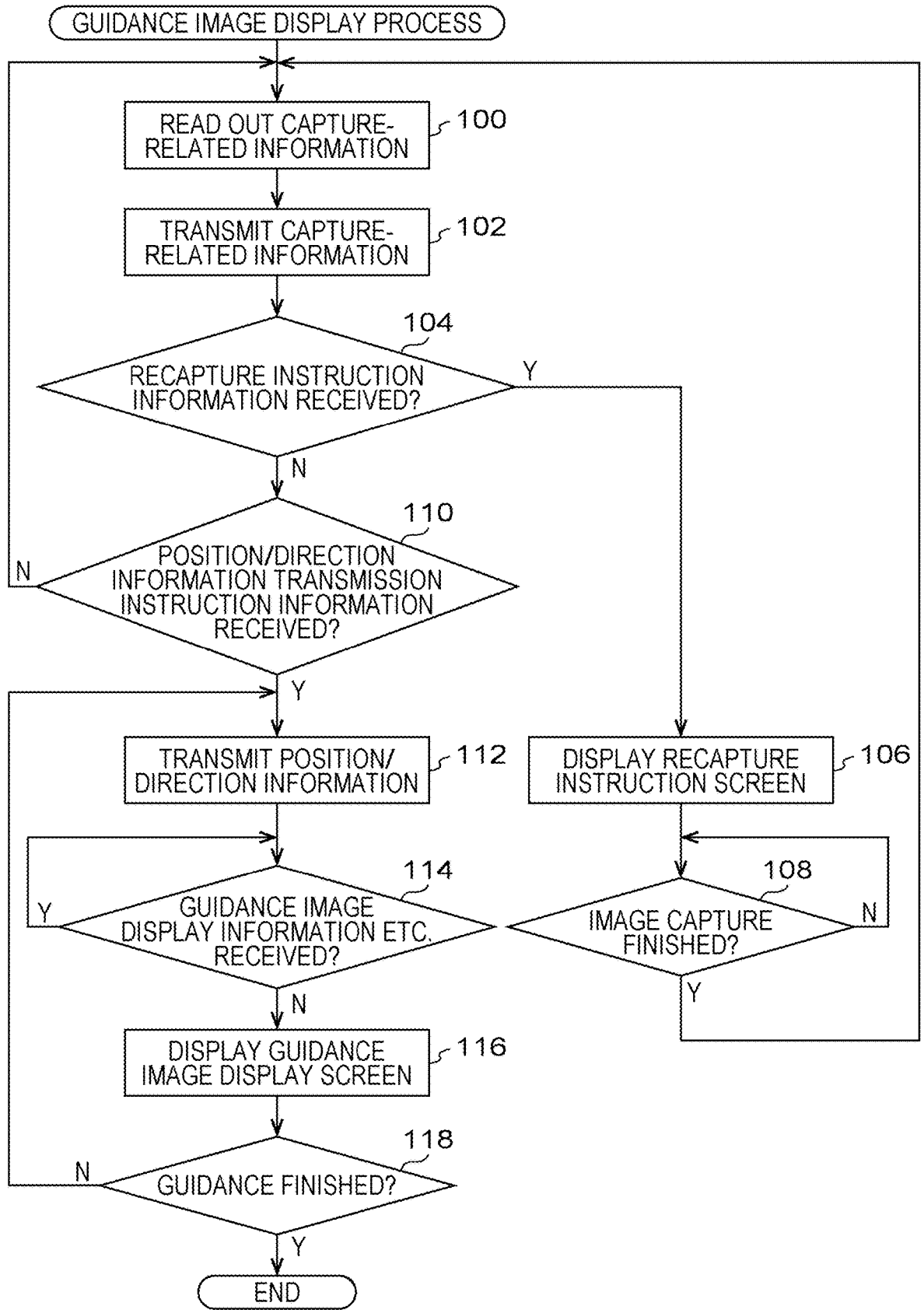
FIG. 5 is a flowchart illustrating an example of a guidance image display process according to a first exemplary embodiment.

Next, FIGS. 5 to 10 will be referenced to describe operations by the remote assistance system 90 according to the present exemplary embodiment. First, FIGS. 5 to 8 will be referenced to describe operations by the terminal device 30 according to the present exemplary embodiment. FIG. 5 is a flowchart illustrating an example of a guidance image display process according to the present exemplary embodiment. Note that to avoid confusion, in the following, a process for giving instructions related to the work to be performed with remote assistance provided by the remote assistance system 90 is omitted, and only a process for guiding the user to the requested capture position is described.

As described above, in the remote assistance system 90 according to the present exemplary embodiment, the user uses the terminal device 30 to capture the subject 50 from multiple directions, and registers the information of the multiple images obtained thereby in the capture-related information database 33B together with information indicating the capture order, the capture position, and the direction.

In this state, if the user inputs an instruction for executing a guidance image display process into the terminal device 30, the CPU 31 of the terminal device 30 executes the guidance image display program 33A, and thereby executes the guidance image display process illustrated in FIG. 5.

In step 100 of FIG. 5, the CPU 31 reads out all of the information stored in the capture-related information database 33B (hereinafter referred to as the "capture-related information", and in step 102, the CPU 31 transmits the read-out capture-related information to the remote device 10.

The remote device 10 receives the capture-related information, and in the case where the multiple captured images indicated by the image information included in the capture-related information do not include an image captured at the requested capture position and direction (hereinafter referred to as the "requested captured image"), the remote device 10 transmits recapture instruction information instructing the user to recapture an image (corresponding to the instruction information described above) to the accessing terminal device 30. At this time, the remote device 10 transmits, to the terminal device 30, recapture instruction information including specification information (in the present exemplary embodiment, information indicating the capture order) that specifies the image information indicating the captured image obtained by image capture at the capture position closest to the requested capture position.

Accordingly, in step 104, the CPU 11 determines whether or not recapture instruction information has been received from the remote device 10. In the case of a negative determination, the flow proceeds to step 110, whereas in the case of a positive determination, the flow proceeds to step 106.

Figure 6:
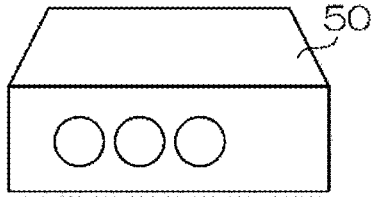
FIG. 6 is a front view illustrating an example of a recapture instruction screen according to an exemplary embodiment.

In step 106, the CPU 11 uses the image information indicating the specification information received together with the recapture instruction information to control the display unit 35 to display a recapture instruction screen having a predetermined configuration, and after that, the CPU 11 stands by in step 108 until the recapture by the user is finished. FIG. 6 illustrates an example of the recapture instruction screen according to the present exemplary embodiment.

As illustrated in FIG. 6, on the recapture instruction screen according to the present exemplary embodiment, a captured image 35A obtained by image capture at the capture position closest to the requested capture position is displayed. Also, a message is displayed on the recapture instruction screen according to the present exemplary embodiment, the message prompting the user to capture several images again at a position close to the position where the displayed captured image 35A was captured.

Accordingly, the user captures several images of the subject 50 again with the terminal device 30 at a position near the position where the captured image 35A displayed on the recapture instruction screen was captured, and updates the registered information in the capture-related information database 33B. Thereafter, the user specifies, via the input unit 34, a finish button 35E displayed on the capture instruction screen. In response, a positive determination is made in step 108, the flow returns to step 100, and the process is executed again from step 100.

On the other hand, in the case where the requested captured image is included among the multiple captured images indicated by the image information included in the received capture-related information, the remote device 10 transmits, to the accessing terminal device 30, position/direction information transmission instruction information instructing the terminal device 30 to transmit information indicating each of the capture position and the direction (hereinafter referred to as "position/direction information") at that point in time.

Accordingly, in step 110, the CPU 31 determines whether or not position/direction information transmission instruction information has been received from the remote device 10. In the case of a negative determination, the flow returns to step 100, whereas in the case of a positive determination, the flow proceeds to step 112.

In step 112, the CPU 31 acquires the position/direction information according to the methods described above, and transmits the acquired position/direction information to the remote device 10.

The remote device 10 receives the position/direction information from the accessing terminal device 30 and uses the information and the capture-related information related to the requested captured image to derive a guidance image for guiding the user to move the terminal device 30 to the capture position and direction where the requested captured image was captured. Thereafter, the remote device 10 derives guidance image display information for virtually displaying the derived guidance image, and transmits the derived guidance image display information to the accessing terminal device 30. At this time, the remote device 10 transmits, to the terminal device 30, guidance image display information including marker display information for virtually displaying a marker at a position (hereinafter referred to as the "target") on the subject 50 on which maintenance is to be performed.

Figure 7:
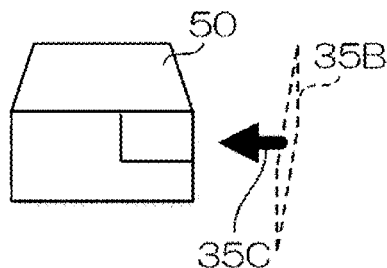
FIG. 7 is a front view illustrating an example of a guidance image display screen according to an exemplary embodiment.

Accordingly, in step 114, the CPU 31 stands by until the guidance image display information and the marker display information is received from the remote device 10. In step 116, the CPU 31 uses the received guidance image display information, marker display information and the image being captured by the image capture unit 38 at that point in time (hereinafter referred to as the "live captured image") to control the display unit 35 to display a guidance image display screen having a predetermined configuration. FIG. 7 illustrates an example of the guidance image display screen according to the present exemplary embodiment.

As illustrated in FIG. 7, a message is displayed on the guidance image display screen according to the present exemplary embodiment, the message prompting the user to set the capture position and direction of the terminal device 30 such that a guidance image 35B is a predetermined shape (in the present exemplary embodiment, a rectangle). Also, on the guidance image display screen according to the present exemplary embodiment, the guidance image 35B is displayed superimposed onto the live captured image. Also, on the guidance image display screen according to the present exemplary embodiment, the display state (in the present exemplary embodiment, the degree of transparency) of the guidance image 35B is continually changed according to the degree of misalignment between the user and the requested capture position (in the present exemplary embodiment, the degree of transparency is increased as the degree of misalignment is reduced). Furthermore, on the guidance image display screen according to the present exemplary embodiment, a capture direction image 35C (in the present exemplary embodiment, an image indicating an arrow) indicating the requested capture direction (direction in which the terminal device 30 faces) is displayed in combination with the guidance image 35B.

In other words, the guidance image 35B according to the present exemplary embodiment is a three-dimensional image having the above predetermined shape (in the present exemplary embodiment, a rectangle) and a predetermined size when the capture position and direction of the terminal device 30 is the requested capture position and direction.

Additionally, in the terminal device 30 according to the present exemplary embodiment, in the case where the capture position and direction of the terminal device 30 are in a different state from the requested capture position and direction, the guidance image 35B is displayed with the appearance of how the guidance image 35B having the predetermined shape and size when viewed from the requested capture position and direction would look in the different state.

FIG. 7 illustrates an example of the guidance image display screen in the case where the subject 50 is being captured from the front presently, and the requested capture position is on the right side of the subject 50. In this case, the guidance image 35B is a parallelogram that is almost a straight line as a distortion of a rectangle, and the size is smaller with greater distance from the terminal device 30 to the subject 50. Consequently, by referring to the guidance image display screen, the user is able to grasp the requested capture position for the subject 50 intuitively from the display position, shape, and size of the guidance image 35B.

Figure 8:
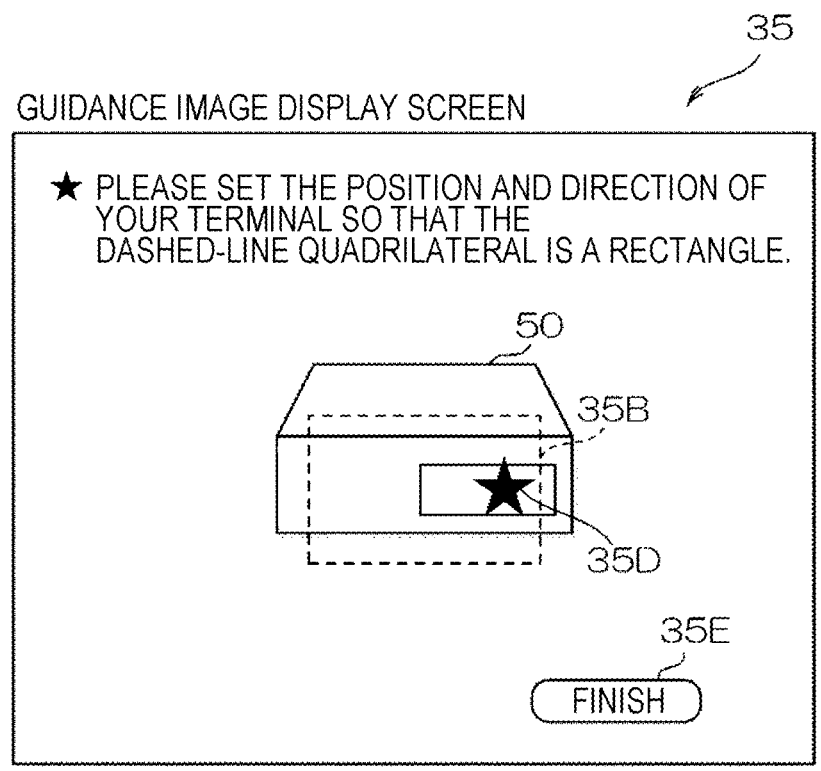
FIG. 8 is a front view illustrating another example of a guidance image display screen according to an exemplary embodiment.

FIG. 8 illustrates an example of the guidance image display screen in the case where the terminal device 30 is moved to the requested capture position and direction from the example illustrated in FIG. 7. In this case, the subject 50 is displayed in a state captured from the right side, and the guidance image 35B is a rectangle. Also, in this case, the target is included in the angle of view of the image capture, and therefore the marker 35D described above is displayed. Consequently, the user is also able to grasp the position of the target easily.

Note that in the present exemplary embodiment, information indicating the guidance image 35B with a different shape, size, and degree of transparency depending on the capture position and direction of the terminal device 30 is continually generated by the remote device 10, but the configuration is not limited thereto. For example, the remote device 10 may generate only a single original form of the guidance image 35B to transmit to the accessing terminal device 30, and the terminal device 30 may generate the guidance image 35B corresponding to the capture position and direction of the terminal device 30 itself.

In step 118, the CPU 31 determines whether or not the terminal device 30 has been moved to the requested capture position and direction and the guidance of the user to the guidance destination is finished. In the case of a negative determination, the flow returns to step 112, whereas in the case of a positive determination, the guidance image display process ends.

By repeating the processes from step 112 to step 118, the subject 50 being captured by the terminal device 30 is displayed by the display unit 35 of the terminal device 30, and in addition, the guidance image 35B is display superimposed in a state according to the capture position and direction of the terminal device 30. Consequently, by referring to the guidance image display screen in this state, the user is able to move the terminal device 30 to the capture position and direction intuitively.

Note that when the guidance image display process ends, a remote assistance process for performing appropriate maintenance on the subject 50 is executed according to known technology of the related art.

Figure 9:
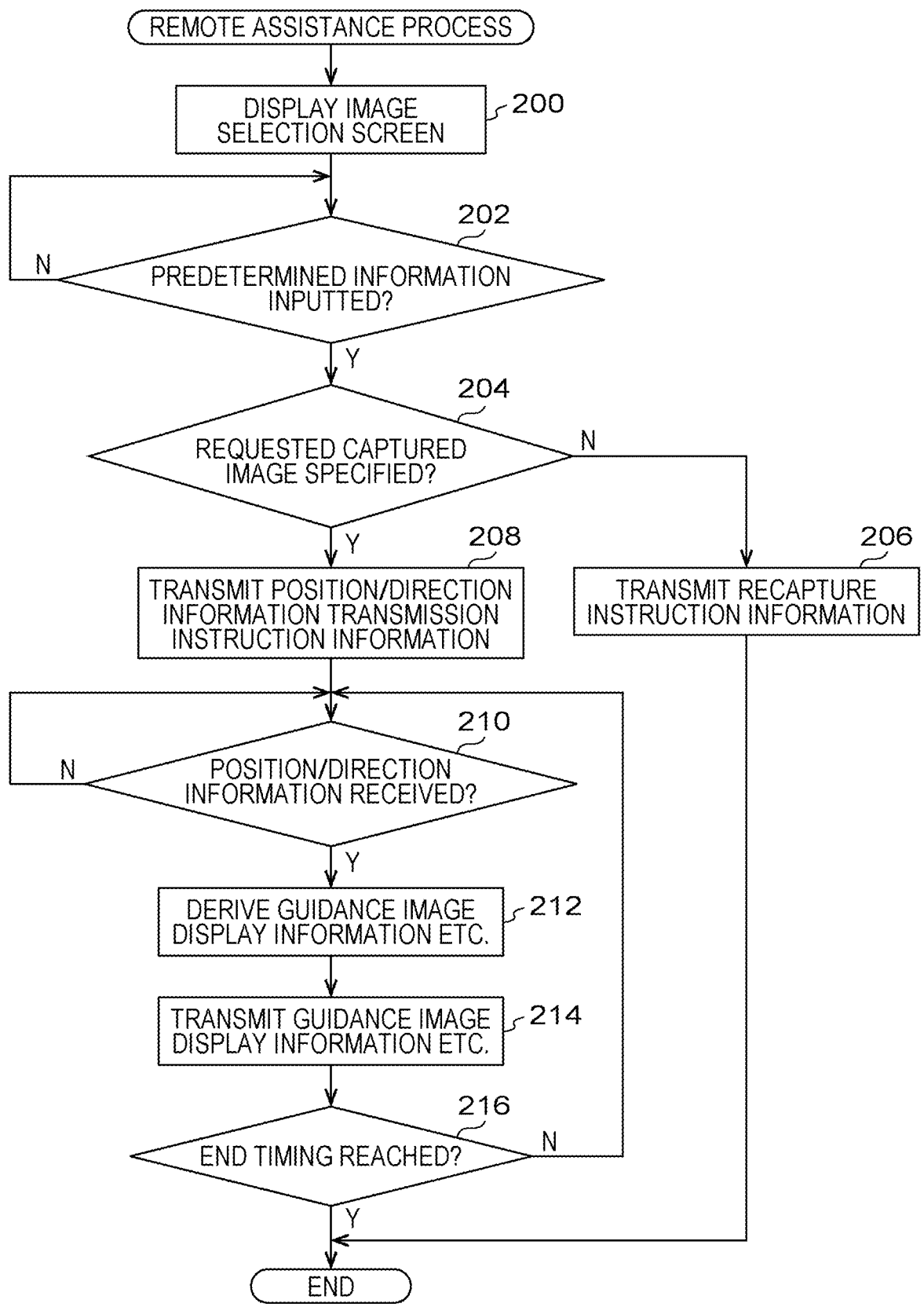
FIG. 9 is a flowchart illustrating an example of a remote assistance process according to an exemplary embodiment.
Figure 10:
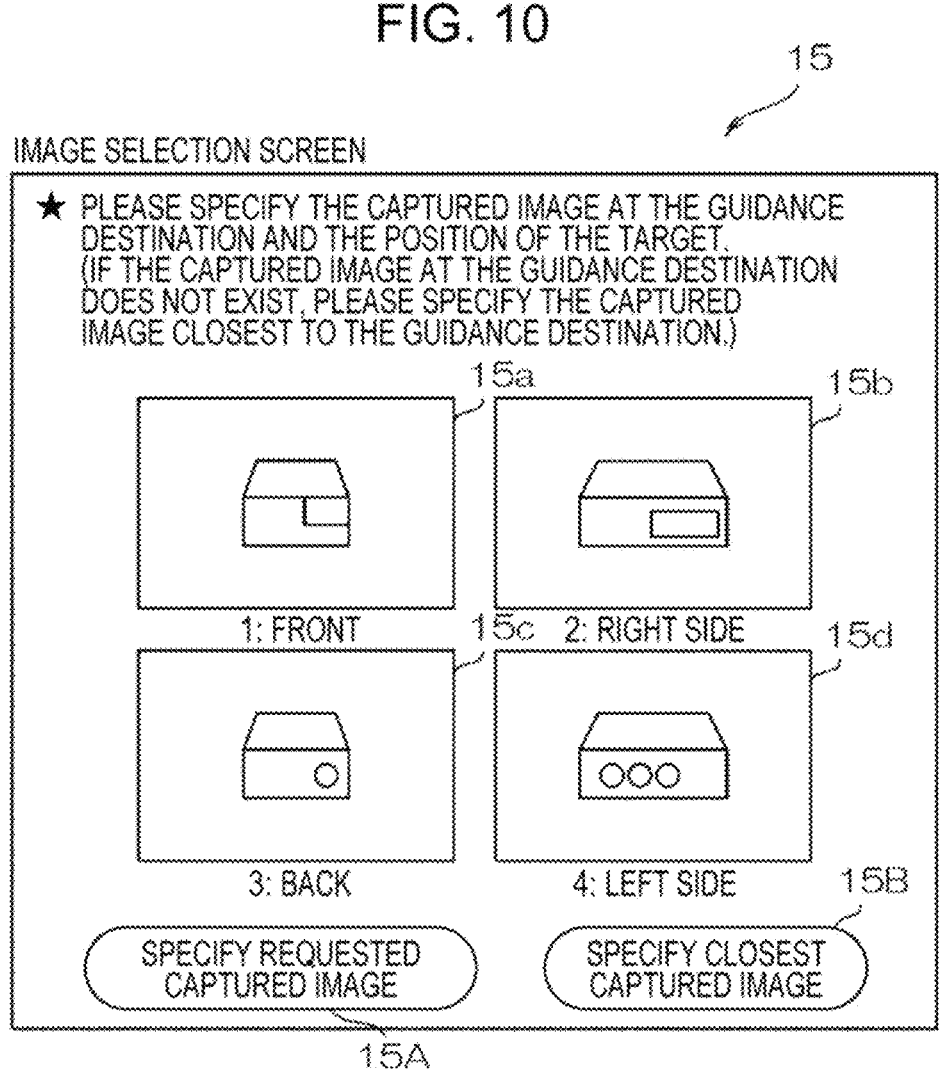
FIG. 10 is a front view illustrating an example of an image selection screen according to an exemplary embodiment.

Next, FIGS. 9 and 10 will be referenced to describe operations by the information processing device 10 according to the exemplary embodiment. FIG. 9 is a flowchart illustrating an example of a remote assistance process according to the present exemplary embodiment. Note that the description here is for the case where the user of the remote device 10 is a person who gives instructions to the user of the terminal device 30 remotely (hereinafter referred to as the "remote instructor").

In the remote assistance system 90 according to the present exemplary embodiment, in the case where the capture-related information described above is received from any terminal device 30, the CPU 11 of the remote device 10 executes the remote assistance program 13A, and thereby executes the remote assistance process illustrated in FIG. 9.

In step 200 of FIG. 9, the CPU 11 uses the received capture-related information to control the display unit 15 to display an image selection screen having a predetermined configuration, and subsequently in step 202, the CPU 11 stands by for the input of predetermined information. FIG. 10 illustrates an example of the image selection screen according to the present exemplary embodiment.

As illustrated in FIG. 10, on the image selection screen according to the present exemplary embodiment, a message prompting the user to specify the captured image captured at the guidance destination and the position of the target described above is displayed, or, in the case where a captured image at the guidance destination does not exist, a message prompting the user to specify the captured image closest to the guidance destination is displayed. Also, on the image selection screen according to the present exemplary embodiment, captured images indicated by the information of multiple images included in the received capture-related information (in the present exemplary embodiment, four captured images 15a to 15d captured from the four directions of the front, the right side, the back, and the left side of the subject 50) are displayed.

Consequently, the remote instructor is able to grasp all of the captured images captured by the accessing user (hereinafter simply referred to as the "user") before the execution of the remote assistance process by the terminal device 30. Accordingly, in the case where a captured image captured at the requested capture position and direction (the requested captured image described above) exists among the multiple captured images being displayed, the remote instructor uses the input unit 14 to specify the requested captured image and the position of the target in the requested captured image. When the remote instructor finishes giving these instructions, the remote instructor specifies a requested captured image specification button 15A through the input unit 14.

In the present exemplary embodiment, the remote assistance is provided by the remote assistance system 90 with respect to maintenance to be performed on the subject 50, and consequently the requested capture position above is a position facing the subject 50 at the point in time when beginning the maintenance. For example, in some cases, internal maintenance may be performed on a digital multi-function device treated as the subject 50, and the first step to perform as part of the maintenance is to open a front panel of the digital multi-function device. In such cases, the remote instructor specifies a captured image obtained by image capture from a capture position in front of the digital multi-function device as the requested captured image.

On the other hand, in the case where the requested captured image does not exist among the multiple captured images being displayed, the remote instructor uses the input unit 14 to specify a captured image obtained from the capture position closest to the capture position of the requested captured image (corresponding to the captured image 35A described above, and hereinafter referred to as the "closest captured image"). When the remote instructor finishes specifying the closest captured image, the remote instructor specifies a closet captured image specification button 15B through the input unit 14.

When the requested captured image specification button 15A or the closest captured image specification button 15B is specified by the remote instructor, a positive determination is made in step 202 and the flow proceeds to step 204.

In step 204, the CPU 11 determines whether or not the requested captured image has been specified by the remote instructor, and in the case of a negative determination, the flow proceeds to step 206. In step 206, the CPU 11 generates and transmits the recapture instruction information described above to the accessing terminal device 30, and thereafter ends the remote assistance process.

On the other hand, in the case of a positive determination in step 204, the flow proceeds to step 208, and the CPU 11 transmits the position/direction information transmission instruction information described above to the accessing terminal device 30. In response, position/direction information is transmitted from the accessing terminal device 30, and in step 210, the CPU 11 stands by until the position/direction information is received from the accessing terminal device 30.

In step 212, the CPU 11 uses the received position/direction information, and the capture-related information and target position corresponding to the specified requested captured image to derive the guidance image display information and the marker display information described above. In step 214, the CPU 11 transmits the derived guidance image display information and the marker display information to the accessing terminal device 30.

In step 216, the CPU 11 determines whether or not an end timing of the remote assistance process has arrived. In the case of a negative determination, the flow returns to step 210, whereas in the case of a positive determination, the remote assistance process ends. Note that in the present exemplary embodiment, the timing at which instruction input giving an instruction to end the remote assistance process is inputted by the remote instructor is applied as the above end timing, but the end timing is not limited thereto. For example, the timing at which the capture position and direction indicated by the received position/direction information is detected to be the requested capture position and direction or the timing at which information indicating that work is finished is received from the user may also be applied as the end timing.

Figure 11:
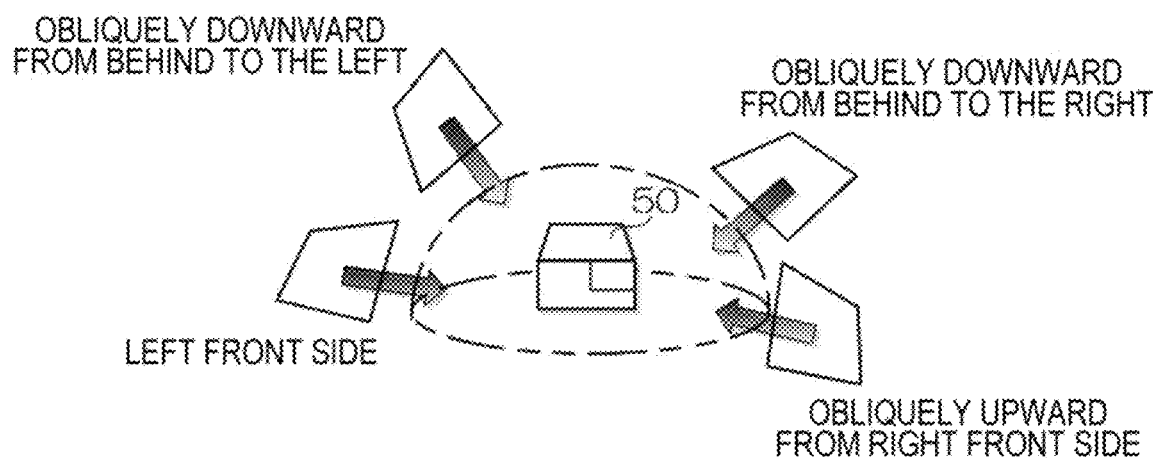
FIG. 11 is a diagram accompanying an explanation of a remote assistance process according to an exemplary embodiment, and is a perspective view illustrating another example of a situation of capturing images with a terminal device.

Note that the present exemplary embodiment describes a case of applying four image captures from the front, the right side, the back, and the left side of the subject 50 as the multiple image captures performed before executing the remote assistance process as illustrated in FIG. 4 as an example, but the configuration is not limited thereto. The number of image captures is not limited to four and may be any plural number, and any capture positions and directions, such as obliquely upward from the right front side and obliquely downward from behind to the left as illustrated in FIG. 11 as an example may also be applied as the capture positions and directions.

In this case, including the front, one of the sides, and the top of the subject 50 in a single image is preferable because it is possible to capture more faces of the subject 50 in a single image and guide the user more efficiently.

Also, the above exemplary embodiment describes a case of applying the degree of transparency as the display state of the guidance image that changes according to the degree of misalignment between the user and the requested capture position, but the configuration is not limited thereto. For example, at least one of the blink interval or the display color may also be applied as the display state, or a combination of multiple types from among three types of display states including the degree of transparency in addition to the blink interval and the display color may also be applied as the display state. For example, in the case of applying the blink interval as the display state, the blink interval may be shortened as the degree of misalignment is reduced, and in the case of applying the display color as the display state, the display color may become redder as the degree of misalignment is reduced.

Second Exemplary Embodiment

The first exemplary embodiment gives an example of a case where the terminal device 30 captures a still image before executing the remote assistance process, but the present exemplary embodiment describes an example of a case where the terminal device 30 captures a video image before executing the remote assistance process.

Note that the configuration of the remote assistance system 90 according to the present exemplary embodiment is the same as the remote assistance system 90 according to the first exemplary embodiment, except for the first transmission unit 31A and the capture-related information database 33B. For this reason, the following describes only the first transmission unit 31A and the capture-related information database 33B according to the present exemplary embodiment.

Namely, in the case where video image capture is performed as the image capture of the subject performed before executing the remote assistance process, the first transmission unit 31A according to the present exemplary embodiment respectively selects one still image for each of a predetermined number of frames in the video image obtained by the video image capture, and transmits the selected still images to the remote device 10.

Also, although omitted from illustration in the drawings, in the present exemplary embodiment, image information indicating a video image is registered instead of information indicating a still image as the information indicating a captured image in the capture-related information database 33B. Also, information about each of the capture position and the direction in a corresponding video image is registered on a predetermined capture interval (in the present exemplary embodiment, 0.3 seconds) as the information about each of the capture position and the direction in the capture-related information database 33B.

Figure 12:
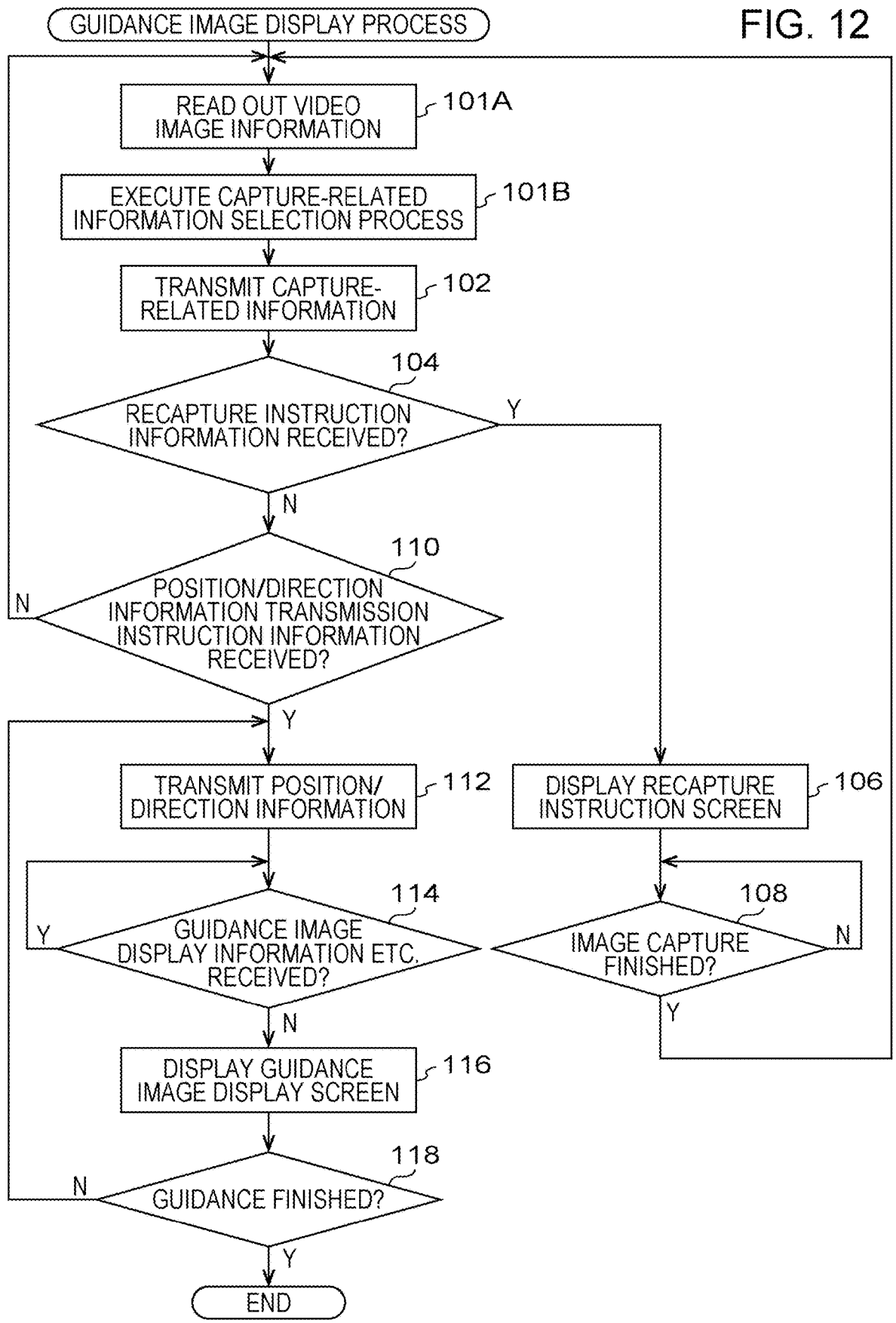
FIG. 12 is a flowchart illustrating an example of a guidance image display process according to a second exemplary embodiment.

Hereinafter, operations by the remote assistance system 90 according to the present exemplary embodiment will be described. Note that the operations according to the present exemplary embodiment are the same as the remote assistance system 90 according to the first exemplary embodiment except for the guidance image display process, and therefore the following references FIG. 12 to describe only the operations by the terminal device 30 according to the present exemplary embodiment for the case of executing the guidance image display process. FIG. 12 is a flowchart illustrating an example of the guidance image display process according to the present exemplary embodiment, and steps for performing the same processes as FIG. 5 are denoted with the same step numbers, and a description of such steps is omitted.

As illustrated in FIG. 12, the guidance image display process according to the present exemplary embodiment differs from the guidance image display process according to the first exemplary embodiment only in that the processes of steps 101A and 101B are applied instead of the process of step 100.

Namely, in step 101A, the CPU 31 reads out all of the information stored in the capture-related information database 33B (hereinafter referred to as the "video image information"). In step 101B, the CPU 11 extracts the image information for which the capture position and direction are stored from the read-out video image information, and selects the information of one image for each of a predetermined number of images (in the present exemplary embodiment, 10) from the extracted image information.

The information of multiple images selected by the above process is information respectively indicating still images, and in step 102, the CPU 11 transmits the image information in association with the information indicating the capture positions and directions corresponding to the image information to the remote device 10. Thereafter, the terminal device 30 and the remote device 10 operate similarly to the first exemplary embodiment.

Note that the above exemplary embodiments describe a case of applying the rectangular guidance image 35B illustrated by way of example in FIGS. 7 and 8 as the guidance image, but the guidance image is not limited thereto. For example, as illustrated by way of example in FIG. 13, a polyhedron having a capture direction designating face 60A, which is a face perpendicular to the requested capture direction (direction in which the terminal device 30 faces), may be applied as a guidance image 60. Note that FIG. 13 is a perspective view illustrating example of the guidance image 60 according to the above configuration.

Figure 13:
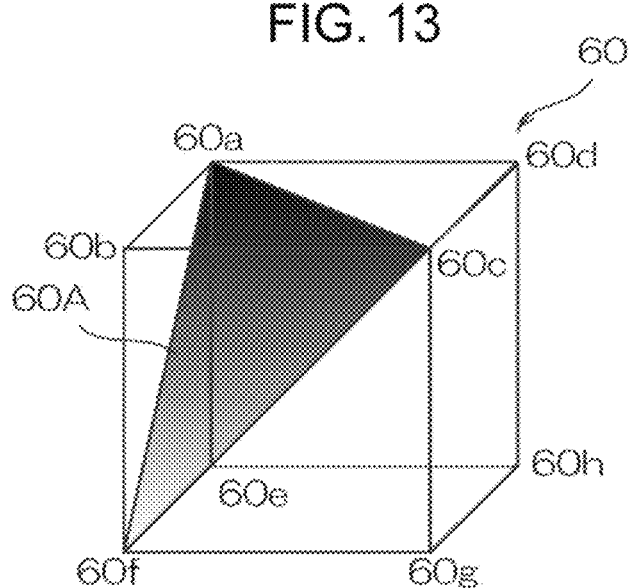
FIG. 13 is a perspective view illustrating another example of a guidance image according to an exemplary embodiment.

As illustrated in FIG. 13, the guidance image 60 has the shape of a regular hexahedron (a cube) having the capture direction designating face 60A described above and eight vertices 60a to 60h.

In the case of applying the guidance image 60, after displaying the image selection screen illustrated by way of example in FIG. 10, the CPU 11 of the remote device 10 causes the display unit 15 to display an enlarged view of the requested capture image specified by the remote instructor. Additionally, the CPU 11 of the remote device 10 causes the display unit 15 to display an image of the guidance image 60 excluding the capture direction designating face 60A, or in other words an image containing only the sides of the regular hexahedron (hereinafter referred to as the "base guidance image") superimposed onto the requested captured image.

When the base guidance image is displayed on the display unit 15, the remote instructor performs operations for moving the displayed base guidance image to the requested capture position and also specifying the vertices such that the capture direction designating face 60A is the face perpendicular to the capture direction according to the requested direction or the face with the closest inclination angle to the perpendicular face. In the example illustrated in FIG. 13, when specifying the capture direction designating face 60A, the remote instructor specifies the three vertices 60a, 60c, and 60f. When the guidance image 60 is obtained according to the specification by the remote instructor, the CPU 11 of the remote device 10 transmits guidance image display information indicating the guidance image 60 to the accessing terminal device 30.

Figure 14:
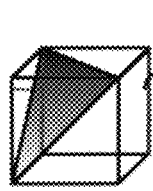
FIG. 14 is a front view illustrating another example of a guidance image display screen according to an exemplary embodiment.
Figure 14:
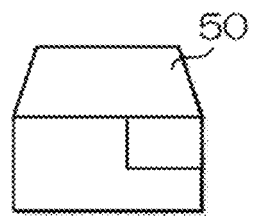

When the guidance image display information is received, the CPU 31 of the terminal device 30 uses the received guidance image display information to display the guidance image display screen illustrated in FIG. 14 as an example on the display unit 35.

In this case, the base guidance image is a regular hexahedron, and therefore the capture direction designating face 60A is an equilateral triangle with no distortion when viewing the face from the front, the direction faces obliquely downward to the right, and the inclination angle is 45 degrees. Consequently, in this case, the user refers to the guidance image display screen to adjust the capture position and direction of the terminal device 30 such that the capture direction designating face 60A is an equilateral triangle.

Figure 15:
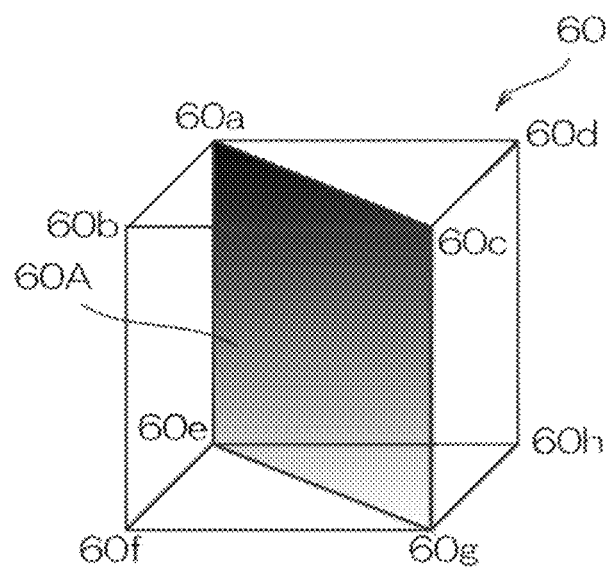
FIG. 15 is a perspective view illustrating another example of a guidance image according to an exemplary embodiment.

Note that in the case of applying a regular hexahedron as the base guidance image, if it is desirable to specify a vertical face as the capture direction designating face 60A and obliquely to the right from the front as the capture direction, it is sufficient to specify the four vertices 60a, 60c, 60e, and 60g as illustrated by way of example in FIG. 15. Also, if it is desirable to specify an outer face of the base guidance image as the capture direction designating face 60A, it is sufficient to specify the vertices 60b, 60c, 60f, and 60g, for example. In this case, a configuration allowing the remote instructor to specify a desired face directly as the capture direction designating face 60A instead of specifying four vertices is also possible. With this configuration, the remote instructor is able to specify the capture direction designating face 60A with just a single specification operation, thereby making it possible to specify the capture direction designating face 60A more easily compared to the case of specifying the capture direction designating face 60A by specifying vertices.

Figure 16:
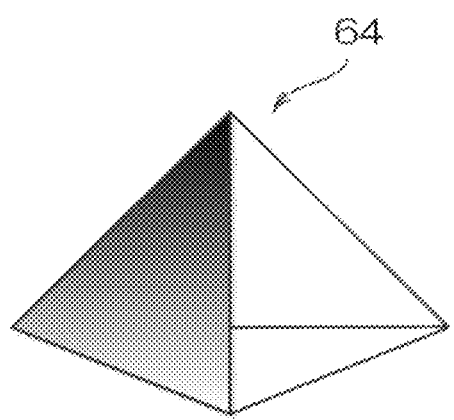
FIG. 16 is a perspective view illustrating another example of a guidance image according to an exemplary embodiment.
Figure 17:
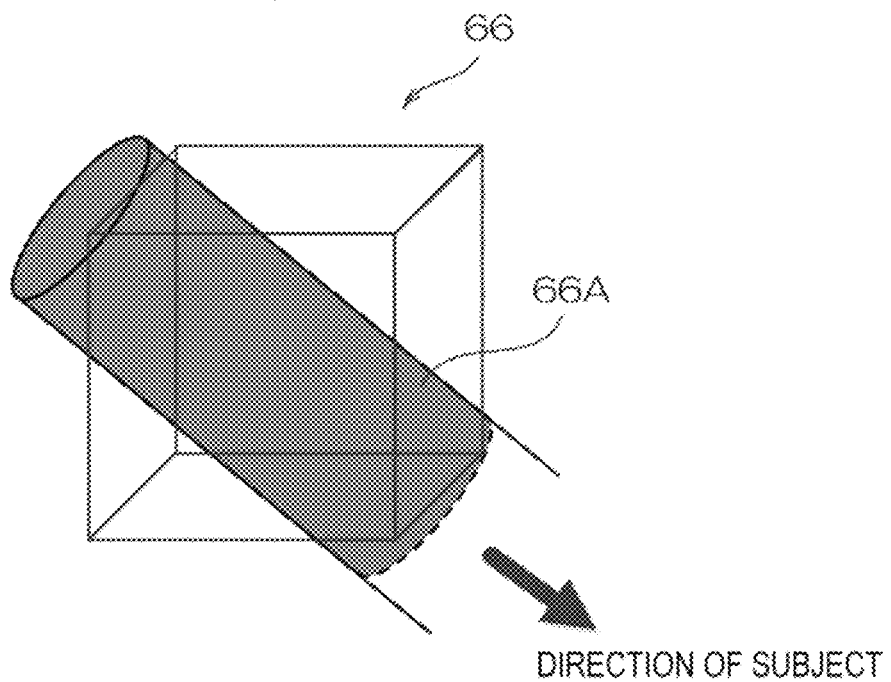
FIG. 17 is a perspective view illustrating another example of a guidance image according to an exemplary embodiment.

Moreover, the polyhedron is not limited to a regular hexahedron, and a guidance image 64 having the shape of a regular tetrahedron may be applied as the base guidance image as illustrated by way of example in FIG. 16, or a hexahedron, tetrahedron, or the like having sides of different lengths may be applied as the base guidance image. Furthermore, the guidance image using a polyhedron is not limited to having only the capture direction designating face 60A as above, and as illustrated by way of example in FIG. 17, a guidance image 66 including the capture direction designating face 60A and further including a columnar image 66A leading to the subject may also be applied. Note that to avoid confusion, in FIG. 17, the capture direction designating face 60A and the subject are omitted from illustration.

Figure 18:
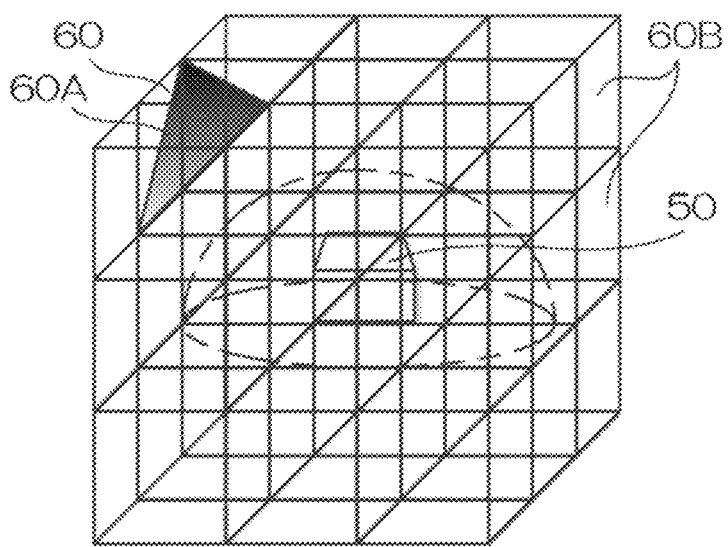
FIG. 18 is a perspective view illustrating another example of a guidance image according to an exemplary embodiment.

Additionally, as illustrated by way of example in FIG. 18, in addition to the guidance image 60, multiple polyhedrons 60B having the same shape and dimensions of the polyhedron of the guidance image 60 but not including the capture direction designating face 60A may be displayed on the display unit 35 of the terminal device 30 and arranged so as to contain a region including the subject 50. This configuration makes it easier for the user to grasp the requested capture position and direction specified by the remote instructor, even if the subject 50 is relatively far away.

The foregoing describes exemplary embodiments, but the technical scope of the present disclosure is not limited to the scope described in the foregoing exemplary embodiments. Various modifications or alterations may be made to the foregoing exemplary embodiments within a scope that does not depart from the gist of the present disclosure, and any embodiments obtained by such modifications or alterations are also included in the technical scope of the present disclosure.

Furthermore, the foregoing exemplary embodiments do not limit the present disclosure as stated in the claims, and not all combinations of features described in the exemplary embodiments are necessarily required as means for addressing the issues of the present disclosure. The exemplary embodiments described above include various levels of disclosure, and the various disclosures are elicited through the combination of the multiple structural elements disclosed herein. Even if several structural elements are removed from among all of the structural elements illustrated in the exemplary embodiments, the configuration with the several structural elements removed therefrom may still be elicited as a disclosure insofar as an effect is obtained.

In the exemplary embodiments, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

Furthermore, the exemplary embodiments above describe a case where the guidance image display process and the remote assistance process are achieved by a software configuration using a computer by executing programs, but the present disclosure is not limited thereto. For example, the guidance image display process and the remote assistance process may also be achieved by a hardware configuration, or by a combination of a hardware configuration and a software configuration.

Otherwise, the configurations of the remote device 10 and the terminal device 30 described in the above exemplary embodiments are a examples, and obviously, unnecessary portions may be removed or new portions may be added within a scope that does not depart from the gist of the present disclosure.

Also, the flows of the guidance image display process and the remote assistance process described in the above exemplary embodiments are examples, and obviously, unnecessary steps may be removed, new steps may be added, or the processing sequence may be rearranged within a scope that does not depart from the gist of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A remote assistance system including a terminal device and a remote device,
the terminal device comprising a first processor configured to:
transmit information of a plurality of images obtained by capturing a subject from respectively different directions to the remote device;
receive display information for displaying a guidance image that guides a user to a requested capture position, the guidance image being derived by the remote device using the image information; and
display the guidance image indicated by the received display information, the remote device comprising a second processor configured to:
receive the information of a plurality of images from the terminal device;
display images indicated by the received information of a plurality of images;
receive a selection of an image captured from the requested capture position from among the displayed images;
derive the display information using the selected image; and
transmit the derived display information to the terminal device.

2. The remote assistance system according to claim 1, wherein the image information is either image information indicating a still image or image information indicating a video image.

3. The remote assistance system according to claim 2, wherein in a case where the image information is the image information indicating a video image, the first processor is configured to select one still image for each of a predetermined number of frames in the video image and transmit the selected still images to the remote device.

4. The remote assistance system according to claim 1, wherein the guidance image is a three-dimensional image.

5. The remote assistance system according to claim 2, wherein the guidance image is a three-dimensional image.

6. The remote assistance system according to claim 4, wherein the three-dimensional image is displayed virtually in a three-dimensional space of a capture region with respect to the subject, and the three-dimensional image indicates a requested capture position and capture direction with respect to the subject.

7. The remote assistance system according to claim 6, wherein the three-dimensional image is configured as a polyhedron.

8. The remote assistance system according to claim 1, wherein the guidance image is an image that is in a predetermined state in a case where the terminal device is moved to a requested capture position and direction.

9. The remote assistance system according to claim 8, wherein the predetermined state is an undistorted state.

10. The remote assistance system according to claim 9, wherein the undistorted state is a rectangular state.

11. The remote assistance system according to claim 1, wherein the different directions include a direction directly facing a front of the subject.

12. The remote assistance system according to claim 1, wherein the different directions include a direction from which a front, one side, and a top of the subject are included in a single image.

13. The remote assistance system according to claim 1, wherein the first processor changes a display state of the guidance image according to a degree of misalignment between the user and the requested capture position.

14. The remote assistance system according to claim 13, wherein the display state is at least one of a blink interval, a display color, or a degree of transparency.

15. The remote assistance system according to claim 14, wherein in a case where the degree of transparency is changed, the first processor is configured to increase the degree of transparency as the degree of misalignment is reduced.

16. The remote assistance system according to claim 1, wherein if a designated position on the subject is captured, the first processor is configured to virtually display a marker at the position.

17. The remote assistance system according to claim 1, wherein in a case where an image captured from the requested capture position is not included among the images expressed by the received information of a plurality of images, the second processor is configured to transmit instruction information instructing the user to recapture an image to the terminal device.

18. The remote assistance system according to claim 17, wherein the instruction information includes specification information that specifies the image information captured at a capture position closest to the requested capture position.

19. A remote device comprising:
a processor configured to:
receive information of a plurality of images obtained by capturing a subject from respectively different directions from a terminal device;
display images indicated by the received information of a plurality of images;
receive a selection of an image captured from a requested capture position from among the displayed images;

use the selected image to derive display information for displaying a guidance image that guides a user to the requested capture position; and transmit the derived display information to the terminal device.

\* \* \* \* \*